United States Patent [19]

Italiano et al.

[11] 4,415,909

[45] Nov. 15, 1983

[54] MULTIPLE NOZZLE INK JET PRINT HEAD

[75] Inventors: Victor J. Italiano, Ithaca; Steven P. Sayko, Dryden, both of N.Y.

[73] Assignee: NCR Corporation, Dayton, Ohio

[21] Appl. No.: 314,913

[22] Filed: Oct. 26, 1981

[51] Int. Cl.³ .............................................. G01D 15/18
[52] U.S. Cl. ................................... 346/140 R; 346/75
[58] Field of Search ........................... 346/75, 140 PD

[56] References Cited

U.S. PATENT DOCUMENTS

| | | | |
|---|---|---|---|
| 3,708,798 | 1/1973 | Hildenbrand et al. | 346/140 PD |
| 4,231,048 | 10/1980 | Horike et al. | 346/140 PD |
| 4,308,546 | 12/1981 | Halasz | 346/140 PD |

FOREIGN PATENT DOCUMENTS

| | | | |
|---|---|---|---|
| 2161315 | 6/1973 | Fed. Rep. of Germany | 346/140 PD |

*Primary Examiner*—George H. Miller, Jr.
*Attorney, Agent, or Firm*—J. T. Cavender; Wilbert Hawk, Jr.; George J. Muckenthaler

[57] ABSTRACT

An ink jet printer has an arrangement of nozzles in a symmetrical pattern and formed by tubular ink channels with cylindrical piezoelectric crystal or like transducers surrounding the tubular channels. The arrangement of nozzles is contained in a small and compact package and is capable of serial printing dot matrix characters in columnar manner.

8 Claims, 4 Drawing Figures

MULTIPLE NOZZLE INK JET PRINT HEAD

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members such as wires or the like and which are typically moved by means of an electromechanical system which may, in certain applications, enable a more precise control of the impact members.

The advent of non-impact printing as in the case of thermal printing, brought out the fact that the heating cycle must be controlled in a manner to obtain maximum repeated operations. Likewise, the control of ink jet printing in at least one form thereof must deal with rapid starting and stopping movement of the ink fluid from a supply of the fluid. In each case, the precise control of the thermal elements and of the ink droplets is necessary to provide for both correct and high speed printing.

In the matter of ink jet printing, it is extremely important that the control of the ink droplets be precise and accurate from the time of formation of the droplets to depositing of such droplets on paper or like record media and to make certain that a clean printed character results from the ink droplets. While the method of printing with ink droplets may be performed either in a continuous manner or in a demand pulse manner, the latter type method and operation is disclosed and is preferred in the present application as applying the features of the present invention. The drive means for the ink droplets is generally in the form of a crystal or piezoelectric type element to provide the high speed operation for ejecting the ink through the nozzle while allowing time between droplets for proper operation. The ink nozzle construction must be of a nature to permit fast and clean ejection of ink droplets from the print head.

In the ink jet printer, the print head structure may be a multiple nozzle type with the nozzles aligned in a vertical line and supported on a print head carriage which is caused to be moved or driven in a horizontal direction for printing in line manner. The ink droplet drive elements or transducers may be positioned in a circular configuration with passageways leading to the nozzles. Alternatively, the printer structure may include a plurality of equally-spaced horizontally-aligned single nozzle print heads which are caused to be moved in back-and-forth manner to print successive lines of dots making up the lines of characters. In this latter arrangement, the drive elements or transducers are individually supported along a line of printing.

In the concept of dot matrix printing, it is generally desired to place the print element actuators in a position to allow characters to be printed in serial manner and this placement requires that the print wires, nozzles, electrodes or other like print actuators be very closely spaced with respect to each other. Since the print actuators are generally larger in size than the diameter of the printed dot, a relatively long wire, channel or like element must be provided to bring the desired print activity from its source, such as a moving armature or plunger or a pressure generating piezoelectric crystal to a vertical closely-spaced column arranged in a pattern such that a column of closely-spaced tangentially coincident or overlapping dots will be produced on the record media if all actuators are fired or actuated at one time. However, it is likely seen that the use of long wires or channels are known to lower the performance of the actuators.

Since it is desirable to eliminate the long curving transition section between the drive elements and the nozzles as in the case of the circular arrangement mentioned above, it is proposed to provide an array of ink jet transducers in a spaced configuration or manner for use in a compact print head.

Representative prior art in the field of ink jet print heads includes U.S. Pat. No. 3,373,437, issued to R. G. Sweet et al. on Mar. 12, 1968, which discloses a fluid droplet recorder with a plurality of jets and wherein a common fluid system supplies ink to an array of side-by-side nozzles.

U.S. Pat. No. 3,683,212 issued to S. I. Zoltan on Aug. 8, 1972, discloses an electro acoustic transducer coupled to liquid in a conduit which terminates in a small orifice through which droplets of ink are ejected.

U.S. Pat. No. 3,832,579 issued to J. P. Arndt on Aug. 27, 1974, discloses a pulsed droplet ejecting system wherein a liquid carrying conduit includes a portion capable of conducting pressure waves in the liquid by means of an electro acoustic transducer surrounding the conduit portion and causing ejection of droplets from the nozzle.

U.S. Pat. No. 3,988,745 issued to S. B. Sultan on Oct. 26, 1976 discloses an ink jet printer having opposed plates provided with piezoelectric disks arranged in a coplanar pattern and a plurality of nozzles arranged in generally linear manner.

U.S. Pat. No. 4,005,440 issued to J. R. Amberntsson et al. on Jan. 25, 1977 discloses a printing head of smaller size and wherein the openings of the capillary tubes are located closer to one another.

U.S. Pat. No. 4,014,029 issued to R. Lane et al. on Mar. 22, 1977 discloses a nozzle plate having at least two rows of nozzles and effecting a staggered nozzle array wherein the nozzles in one row are laterally displaced with respect to the nozzles in another row to print a portion of a line at a time, a line at a time, or several lines at a time.

U.S. Pat. No. 4,023,180 issued to W. J. Zenner on May 10, 1977 discloses a dot printer with electrically propelled ink wherein current is passed through the ink under the influence of a magnetic field between electrodes and the resulting EMF propels droplets of ink through nozzles arranged in linear manner.

U.S. Pat. No. 4,038,667 issued to S. L. Hou et al. on July 26, 1977, discloses a plurality of droplet-forming nozzles arranged in linear manner and wherein droplets are ejected by means of piezoelectric transducers surrounding the nozzles.

U.S. Pat. No. 4,128,345 issued to J. F. Brady on Dec. 5, 1978 discloses a fluid impulse matrix printer having a two-dimensional array of tubes in a dot matrix for printing a complete character at a time.

U.S. Pat. No. 4,158,847 issued to J. Heinzl et al. on June 19, 1979, discloses a piezoelectric operated print head having twin columns of six nozzles.

And, U.S. Pat. No. 4,189,734 issued to E. L. Kyser et al. on Feb. 19, 1980 discloses a writing fluid source feeding drop projection means which ejects a series of droplets through a column of seven nozzles with sufficient velocity to traverse a substantially straight trajectory to the recording medium.

SUMMARY OF THE INVENTION

The present invention relates to ink jet printers and more particularly to an array of ink droplet drive elements or transducers arranged in a compact configuration. In accordance with the present invention, there is provided an ink jet print head having a housing and a plurality of print actuators arranged in a symmetrical pattern and equally spaced whereby time of actuation of the respective actuators is time delayed to enable serial printing of dot matrix characters in columnar manner during travel of the print head in one direction.

In ink jet printing, it is known that a nozzle design of advantageous nature consists of a cylindrical piezoelectric crystal or magnetostrictive device and which includes a thin walled glass tube which is tapered at one end to form an exit orifice having a very small diameter. Since it is also advantageous and desirable that the drive element or transducer or like actuating device be in close proximity to the orifice to provide optimum operation, the individual drive elements must be placed in an arrangement different from the well-known vertical, single character high, column format. Each of such ink droplet drive elements includes a glass tube with a nozzle formed at one end thereof and a piezoelectric crystal positioned on the exterior of the glass tube for initiating the formation of ink droplets by pulsing the ink supply inside the tube and causing ink to be ejected from the nozzle in droplet form.

The nozzle array is formed in a pattern to generate equally separated rows of dots on the record media or paper. The print head consists of a cluster of tubular transducers or ink droplet drive elements wherein each drive element has a piezoelectric actuating means and a coaxial nozzle. In a preferred arrangement, the particular nozzle array of the print head consists of a certain number of print elements arranged in circular manner and rotated at an angle to a plane or line of symmetry and wherein the print head is moved along a line of printing with the line of symmetry being at said angle relative to the direction of motion to produce a vertical column of dots or a column of dots perpendicular to the direction of motion. The times for energizing the individual print elements or the proper time intervals for firing the actuators are accomplished so as to minimize the effect of the gap between the nozzles and the record media with regard to the dot positions and also to provide the precise column of dots.

Another arrangement of the print element array of the print head is accomplished by placing the nozzles at equally spaced intervals which are on nominal horizontal font positions and wherein the delay for columnar placement of dots is equal to the time interval between the dots.

In view of the above discussion, the principal object of the present invention is to provide an ink jet print head for generating vertical columns of dots on record media.

Another object of the present invention is to provide a plurality of ink droplet drive elements formed in a compact cluster print head configuration.

An additional object of the present invention is to provide a print head having a cluster of ink droplet actuating members positioned in parallel manner.

A further object of the present invention is to provide a print head having a compact array of ink droplet drive elements and associated ink nozzles arranged in circular manner to enable dot matrix type printing.

Still another object of the present invention is to provide a print head having an array of ink droplet drive elements in an arrangement to limit the overtravel required by the print head at the end of a print line.

Additional advantages and features of the present invention will become apparent and fully understood from a reading of the following description taken together with the annexed drawing.

DESCRIPTION OF THE PREFERRED EMBODIMENT

Figure 1:
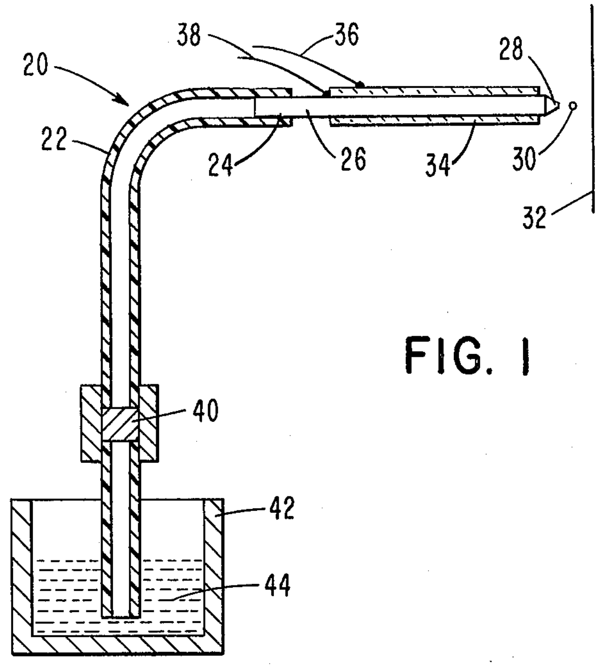
FIG. 1 is a view of an existing type transducer element used in the present invention.

Referring now to the drawing, FIG. 1 illustrates a transducer element of the pulse-on-demand type as disclosed in Zoltan U.S. Pat. No. 3,683,212 or Arndt No. 3,832,579, mentioned above. While these transducer elements are well-known, it may be desirable to use the arrangements of the present invention with any type of print actuator wherein the centerlines of the dot producing devices cannot be arranged to generate a column of dots of the proper height. The single transducer permits a relatively fast loading or filling with ink along with permitting reliable purging of any air bubbles in the ink and provides good performance of 2,000 drops or more per second in operation. However, since these single drop-on-demand transducers have somewhat limited performance potential and application, it has been the practice to collect several transducers and nozzles into a cluster or arrangement as disclosed in Heinzl et al. U.S. Pat. No. 4,158,847 or Kyser et al. No. 4,189,734, also mentioned above. It is readily seen, however, that in these patents a transition period is essential and is provided between the piezoelectric actuator or driver portion of the print head and the nozzles of the head.

The transducer element 20 of FIG. 1 includes an inlet tube 22 fitting over one end 24 of a glass tube 26 which is reduced or necked down at the other end to form a nozzle 28 for ejection of ink droplets 30 onto record media 32 which is normally spaced a relatively small distance from the nozzle. The glass tube 26 serves as an elongated ink chamber around which is provided a piezoelectric crystal in the form of a sleeve 34 bonded to the tube and which has electrical leads 36 and 38 connected thereto. When the piezoelectric crystal 34 is electrically pulsed, a droplet 30 of ink is ejected from the nozzle 28 by reason of the sudden constriction of the crystal 34 and of the walls of the tubing 26. The inlet tube 22 carries ink through a filter 40 from supply means in the form of a reservoir 42 having a supply of ink 44. The inlet tube 22 is made of a pliable grade of elastomer such as silicone rubber to provide for absorption of upstream propagating pressure pulses and to prevent these pulses from interfering with the ink drop generation process.

Figure 2:
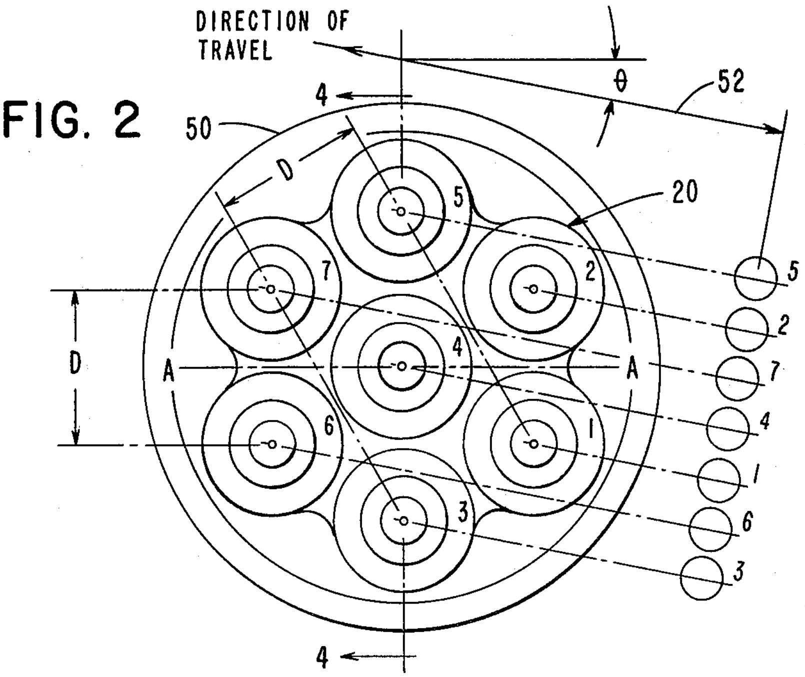
FIG. 2 is a front view of a plurality of ink jet nozzles in a preferred arrangement of the invention.

By reason of the samll diameter of the tubular type pulse-on-demand transducer, it is possible to cluster a number of these transducers in an arrangement or pattern so as to form a matrix print head of several actuators in a very small and compact area. FIG. 2 shows a front view of seven nozzles of the transducers 20 arranged in a circular configuration wherein six nozzles surround a central nozzle. A housing 50 enclosing the seven nozzles serves to locate the nozzles in their proper orientation and also protects the various elements. The orientation of the seven nozzles is designed in a manner to provide an angle between a horizontal plane or line of symmetry and the direction of travel of the cluster of actuators in the print head as shown by the arrow line 52. In another phrasing of the configuration, the relationship between the column of dots and the print head is described as rotating the print head at the angle relative to the line of symmetry of the print head or the actuators therewithin, and moving the print head with the line of symmetry at the angle relative to the direction of motion or travel to produce a column of dots which are perpendicular to the direction of travel or motion and dependent upon firing of the actuators at the proper time intervals.

In the case of an actuator group or cluster moving at a constant speed S and having actuators of nozzle center distance D, the time delay for the print actuators to produce dots at a particular horizontal dot column position along the print line (the print head moving from left to right) is determined by the following table:

| Actuator | Time Delay |
|---|---|
| 1 | 0 |
| 2 | $t_d = \frac{D}{S} \sin \theta$ |
| 3 | $4t_d$ |
| 4 | $5t_d$ |
| 5 | $6t_d$ |
| 6 | $9t_d$ |
| 7 | $10t_d$ |

where $\theta$ is an angle of 10.9 degrees. If the horizontal and vertical dot spacings are to be equal in the dot matrix pattern, then $t_d=0.567$ times the time it takes a nozzle to traverse or travel one dot column. The character height h produced by the seven actuators and arranged in the pattern of FIG. 2 is given by the equation $$h=6D \sin (30°-\theta)+d_d$$

where $d_d$=diameter of the printed dot.

In the specific case of an ink jet piezoelectric crystal having a diameter of 1.27 millimeters and an ink dot diameter of 0.33 millimeters, the acceptable character height is determined to be 2.87 millimeters. The overall diameter of the cluster or array as shown by the housing 50 in FIG. 2 allows printing of dot matrix characters in serial manner and the overall print head package is contained in the smallest possible form. It can be seen that, by reason of the symmetry of the transducers 20 within the housing 50, rotation of the print head to any one of $2\pi/n+\theta$ positions will produce the same result, where n is a number from 1 to 5. It is also seen that only seven transducers can be utilized in the symmetrical arrangement of FIG. 2.

Figure 3:
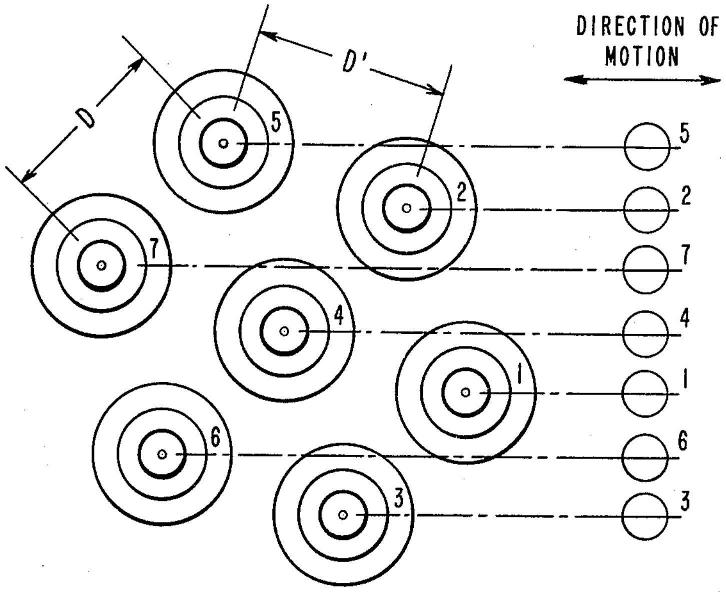
FIG. 3 is a front view of a modified arrangement of the nozzles.

FIG. 3 is a front view of a modified arrangement where the nozzles are placed at equally spaced intervals which are spaced on and correspond to nominal horizontal dot positions. In this arrangement, the delay for columnar placement of dots in equal to the time interval between dots, thereby allowing proper dot placement by merely keeping track of and timing actuations of the nozzles at integral dot positions as the print head travels along the print line. In this case, the maximum diameter D of the print actuator is 2.83d where d is the dot center distance. In the case of an ink jet piezoelectric crystal having a diameter of 1.27 millimeters and a dot center distance of 0.45 millimeters, the overall character height is determined to be 3.07 millimeters.

It can generally be said that any odd number N of actuators can be grouped in a similar pattern, as shown in FIG. 3, at locations described wherein the center nozzle 4 is at point X=0, Y=0 and the other nozzles are positioned at integral units (X and Y) of dot center distances d such that:

$$\frac{-(N-1)}{2} \leq X \leq \frac{(N-1)}{2},$$

$$\frac{-(N-1)}{2} \leq Y \leq \frac{(N-1)}{2} \text{ and } |X| + |Y| = \frac{N+1}{2}$$

where actuator center distances D and D' are equal to $\sqrt{8}$d and $\sqrt{10}$d, respectively.

Figure 4:
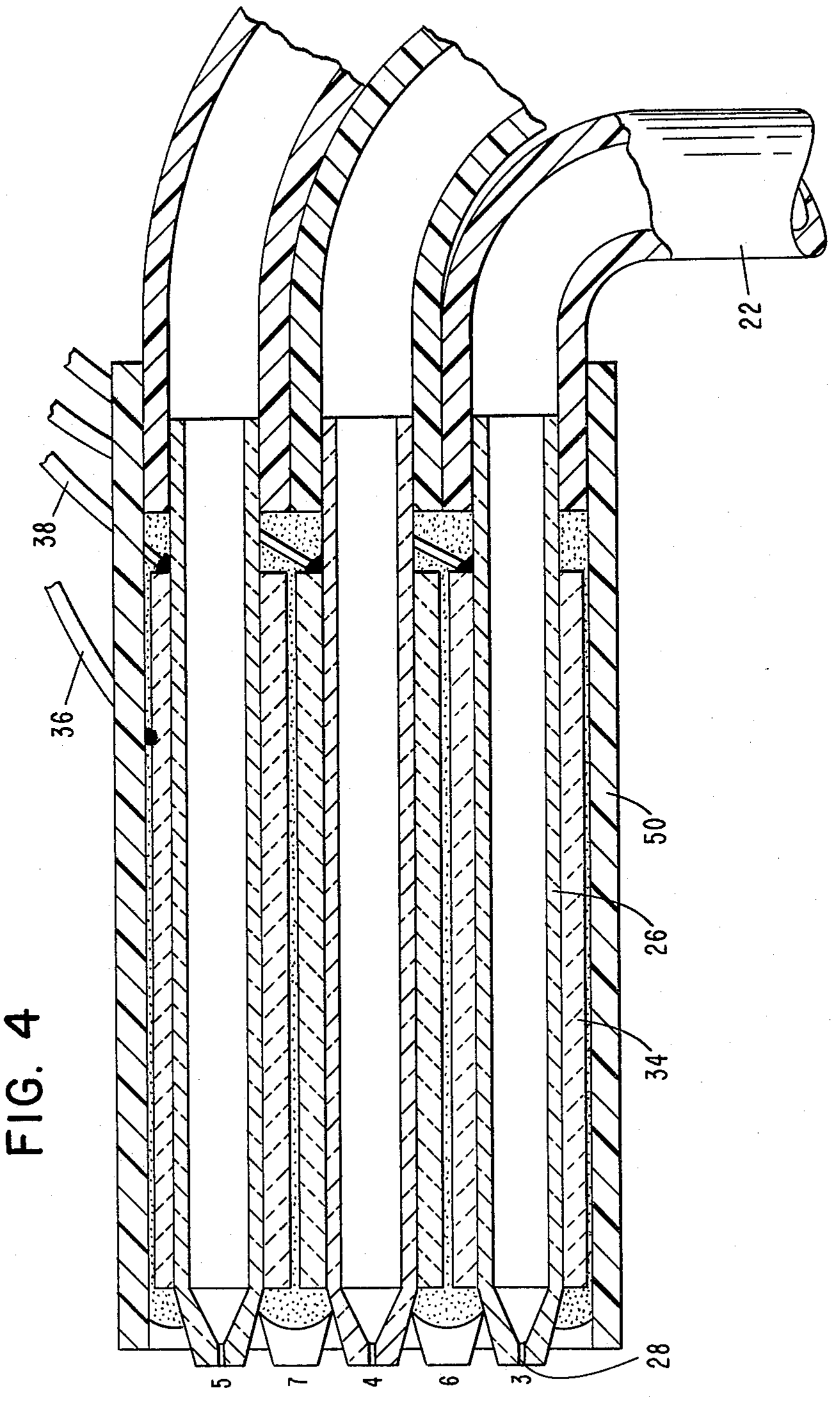
FIG. 4 is a sectional view of the nozzle arrangement, taken along plane 4—4 of FIG. 2.

FIG. 4 shows a sectional view of the ink jet nozzle arrangement of FIG. 2 in the housing 50. Each of the transducer elements 34 has an ink inlet tube 22 and a nozzle orifice 28 along with electrical leads 36 and 38. The nozzle assemblies are located axially in the housing 50 by either fixturing methods or by means of features on the outer housing. The electrical leads 36 and 38 are brought outside the housing through a notch in the rear thereof. The housing 50 locates the nozzle assemblies so that a very small clearance exists between the adjacent nozzles, and the entire assembly is filled with a visco elastic material of sufficient insulating value for the applied voltage. The nozzles may be constructed with the drive voltage applied to the inner surface of the piezoelectric crystal, and the outer surfaces of the crystals may then be connected by an electrically conductive spacer in a manner wherein only a single ground return wire is necessary for all print actuators.

It is thus seen that herein shown and described is an ink jet print head wherein individual transducers are placed in a pattern and configuration to provide a compact unit. The transducers are symmetrical and equally spaced in one arrangement and the times of actuation are controlled to print columns of dots in serial manner and to form characters during travel of the print head. The arrangement enables the accomplishment of the objects and advantages mentioned above, and while a preferred embodiment and a modification thereto have been disclosed herein, other variations may occur to those skilled in the art. It is contemplated that all such variations and modifications not departing from the spirit and scope of the invention hereof are to be construed in accordance with the following claims.

We claim:

1. An ink jet print head comprising a housing and a plurality of print actuators arranged in a generally circular symmetrical pattern and including tubular members having nozzles axially parallel therewith and equally spaced whereby time of actuation of the respective actuators is time delayed to enable serial printing and equal dot spacing of dot matrix characters in columnar manner on record media spaced from said nozzles during travel of the print head in one direction.

2. The print head of claim 1 wherein the plurality of actuators are rotatably oriented with respect to each other in a pattern at an angle to the direction of travel of the print head to print dot matrix characters in serial manner.

3. The ink jet print head of claim 1 wherein said print actuators each comprise a tubular member containing ink and a transducing element surrounding the tubular member.

4. The ink jet print head of claim 1 wherein said print actuators each comprise a tubular ink channel and a cylindrical piezoelectric crystal surrounding said channel.

5. An ink jet printer comprising a housing, and an odd number of ink jet print actuators positioned in a generally circular symmetrical pattern within the housing and including cylindrical members having nozzles axially parallel therewith and spaced in relation to each other whereby time of actuation of the respective actuators is time delayed to provide serial printing and equal dot spacing of dot matrix characters in columnar manner on record media spaced from the nozzles during travel of the printer in one direction.

6. The printer of claim 5 wherein the actuators are rotatably oriented with respect to each other in a pattern at an angle to the direction of travel of the printer to print dot matrix characters in serial manner.

7. The printer of claim 5 wherein the actuators ech comprise a tubular member containing ink and a transducing element surrounding the tubular member.

8. The printer of claim 5 wherein the print actuators each comprise a tubular ink channel and a cylindrical piezoelectric crystal surrounding said channel.

* * * * *